United States Patent Office 3,198,852
Patented Aug. 3, 1965

3,198,852
POLYAMIDE COMPOSITIONS STABILIZED
WITH POLYOXYMETHYLENE
David Tanner, Wilmington, Del., assignor to E. I. du Pont de Nemours and Company, Wilmington, Del., a corporation of Delaware
No Drawing. Filed Dec. 9, 1960, Ser. No. 74,785
9 Claims. (Cl. 260—857)

This invention relates to a novel and useful composition of matter and to shaped objects produced therefrom.

In the production of shaped objects from synthetic linear polyamides, it is well known that the properties of such objects may be enhanced for certain purposes by treatment with formaldehyde to produce cross links between the polymer chains. Various of these properties and effects such as increased solvent resistance, increased melting point, recovery from deformation and enhanced elasticity have been disclosed in U.S. 2,540,726 issued February 6, 1951, to Graham et al.

In many cases, it is desirable that the cross-linking be effected after the polyamide article is in substantially its final form, e.g., after a yarn has been woven into a fabric. For this purpose the prior art processes which involve treatment with aqueous or gaseous formaldehyde have certain undesirable features arising from the toxicity of the formaldehyde and the fact that fabric finishers and other handlers of products of this nature are not well equipped to handle such chemicals. On the other hand, when paraformaldehyde or the like has been admixed with the polyamide, it has been impossible to melt-extrude the admixture without decomposing the cross-linking agent with the result that the crosslinking cannot then be effected in the finished product.

It is an object of this invention to provide a novel and useful polyamide composition containing a formaldehyde liberating substance which is sufficiently stable to permit melt extrusion into shaped articles with essentially no crosslinking but which may be subsequently decomposed to crosslink the polyamide at the desired point in the fabrication of finished articles. Another object is to provide a melt-extruded shaped article containing a substantially undecomposed formaldehyde liberating substance. A further object is to provide a melt spun polyamide fiber containing a substantially undecomposed formaldehyde liberating substance.

The above objects are accomplished according to this invention by the provision of a composition comprising from about 75 to about 98% by weight of a synthetic linear polyamide and from about 2 to about 25% by weight of an organic diether or ester of a polyoxymethylene having a reaction rate constant at 222° C. of less than 1%. This composition may be melted and formed into a shaped article without appreciable decomposition of the polyoxymethylene derivative. By subsequently heating the shaped article, or other products prepared therefrom, at a temperature between about 120 and about 210° C., in contact with a catalyst such as ammonium chloride, zinc fluoroborate, ammonium fluoroborate, fluoroboric acid or oxalic acid, the polyamide will be crosslinked by the evolving formaldehyde.

The polyoxymethylene derivatives mentioned above have the general formula:

$$R-(CH_2O)_n-R_1$$

wherein R is either hydrogen, an ester radical:

or an ether radical:

and $R_1$ is an ester or ether radical as defined above; $R_2$ is an aliphatic or aromatic radical; $R_2$ is any aliphatic radical of 1 to 6 carbon atoms and $n$ is at least 330 and preferably in the range of 500–2,000.

Polyoxymethylene suitable for use in preparing the formaldehyde liberating derivative may be prepared as described in U.S. 2,768,994 by continuously passing gaseous, substantially anhydrous, monomeric formaldehyde into a reaction zone containing a reaction medium which is inert to formaldehyde under the conditions of the reaction, and permitting the formaldehyde to polymerize continuously as the monomer is introduced. The organic ester may be prepared by reacting the polyoxymethylene with an organic acid anhydride as described in British Patent 770,717 or by reaction with ketenes as described in Belgian Patent 582,454.

The polyoxymethylene diethers suitable for use in the present invention may be prepared as described in Belgian Patent 570,884 by reacting the polyoxymethylene in an acidic reaction medium with a dialkyl acetal having the formula:

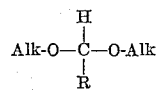

wherein "Alk" is an alkyl group of 1–6 carbon atoms and R is from the group consisting of hydrogen and alkyl groups of 1–5 carbon atoms. Alternatively, the ether may be formed, as described in Belgian Patent 584,924, by reacting the polyoxymethylene in slightly acid medium with orthoesters, ketals or orthocarbonates having the general formula:

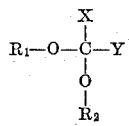

wherein $R_1$ and $R_2$ are alkyl groups of 1–4 carbon atoms; Y is selected from the class consisting of hydrogen, alkyl groups of 1–4 carbon atoms and alkoxy groups of 1–4 carbon atoms; when Y is hydrogen, X is an alkoxy group of 1–4 carbon atoms and when Y is an alkyl or alkoxy group, X is an alkyl or alkoxy group having 1–4 carbon atoms. By means of the above reactions, the polyoxymethylene chains consisting predominantly of recurring $-CH_2O-$ groups, are terminated at either end by alkyl groups of 1–6 carbon atoms.

The polyamide and the polyoxymethylene derivative are conveniently mixed together in particulate form, such as in the form of pellets or flakes, to give a uniform mixture which is then melt extruded to form fibers or other shaped articles. When the composition is melt extruded to form filaments, the filaments may be cold drawn and otherwise treated as is conventional for polyamide fialments.

The reaction rate constant for thermal degradation of the polyoxymethylene at 222° C. is determined by placing about 1 gram of the polymer to be tested in a small ampule open to the atmosphere through a single capillary tip. The ampule is evacuated, filled with nitrogen and then evacuated a second time and filled with nitrogen a second time. The ampule is then suspended from a balance in a vapor bath at 222° C. The vapor is obtained by boiling methylsalicylate and allowing the vapors, which are at 222° to 223° C., to surround the ampule and maintain it at a constant temperature. As the polymer in the ampule degrades into formaldehyde vapors the weight of the remaining solid polymer is recorded at periodic intervals beginning at the moment the methylsalicylate vapors reach the top of the ampule. These values are then plotted as the weight percent of undegraded polymer versus the corresponding time from the beginning of degradation. These plotted values normally define a line which is essentially straight throughout the major portion of the degradation. The value of the reaction rate constant for thermal degradation, $k$ is 2,303 multiplied by the slope of the plotted line, and is reported as the slope of the straight line portion of the curve. The units of $k$ are reciprocal minutes if the time, $t$, is in minutes, and therefore a $k$ of 0.01 reciprocal minutes is equivalent to 1% per minute and represents a polymer degradation in which 1% of the polymer is being degraded per minute of reaction.

The flow number of the polyoxymethylene derivative reported in the following examples is determined by charging 5 grams of the derived polymer into the cylinder of a standard polyethylene melt indexer, the cylinder being maintained at 200° C. and being fitted with an extrusion orifice having a diameter of $0.043 \pm 0.0002$ inch and a length of $0.158 \pm 0.001$ inch. The piston, weighing 60 grams, is inserted into the cylinder and is loaded with a weight of 5,000 grams. At an elapsed time of 5 minutes after the polymer is charged into the cylinder, the extrudate is cut off and discarded. At a total elapsed time of 6, 7, 8, 9 and 10 minutes, the extrudate is cut off and weighed to an accuracy of $\pm 1$ percent. The weights of these 5 extrudates are plotted against time and the best straight line is drawn through the 5 points. From this curve the number of grams flowing through the orifice in 10 minutes is determined and reported as the flow number. The flow number has been found to correlate with the number average molecular weight of the polymer, a flow number of 8.5 corresponding to a molecular weight of about 33,000, and a flow number of 0.9 to a molecular weight of about 75,000.

The relative viscosity of the nylon polymer is measured by dissolving 5.5 grams of polymer in 50 milliliters of 90% formic acid. The ratio of the absolute viscosity of this solution at 25° to the absolute viscosity of the formic acid solvent is reported as relative viscosity.

The filaments or other articles may subsequently be treated in any stage of the processing, such as in the form of a fabric, to liberate formaldehydes from the polyoxymethylene and thus crosslink the polyamide chains. This may be accomplished by application of suitable catalyst and heat.

The number of crosslinks introduced between polyamide chains by reaction with formaldehyde has been found to be inversely proportional to the equilibrium volume swelling ratio, $q_m$, of segments of polyamide filaments, i.e., the ratio of the volume of a filament segment after treatment with a swelling agent (m-cresol) to the volume of the segment before swelling. The equilibruim volume swelling ratio may be expressed as, $$q_m = \frac{V}{V_0} = \frac{L \times D^2}{L_0 \times D_0{}^2}$$

where, $V$ = volume of swollen filament segment at equilibrium
$V_0$ = Volume of unswollen filament segment
$L$ = Length of swollen filament segment at equilibrium
$L_0$ = Length of unswollen filament segment
$D$ = Diameter of swollen filament cross section
$D_0$ = Diameter of unswollen filament cross section The values $L$ and $L_0$ are obtained by measuring microscopically the length of a small segment of a filament before and after swelling in m-cresol, the swelling being allowed to proceed until equilibrium is reached. The values of $D$ and $D_0$ are obtained by cutting thin cross sections of the filament, mounting them on a microscope slide in the conventioinal manner and measuring the diameter microscopically before and before swelling with m-cresol. The $q_m$ values obtained in this manner have been found to correlate well with the degree of crosslinking in a polyamide fiber as measured by a chemical analysis.

*Example I*

Polyoxymethylene having a reaction rate constant of 0.6% is prepared as described in U.S. 2,768,994 and reacted with acetic anhydride, using pyridine as a catalyst, as described in British 770,717. The resulting polyoxymethylene ester, which has a flow number of 8.5, is mixed in granular form with 6-6 nylon, poly(hexamethylene adipamide) flake, which is prepared in the conventional manner and has a relative viscosity of 35. The resulting mixture, which contains 15 parts of the polyoxymethylene ester and 85 parts of nylon, is melted and extruded in the conventional manner using a screw-type melting unit, the temperature of the melt being 288° C. and the hold-up time between melting and extrusion being about 5 minutes. The molten mixture is extruded to form 34 filaments which are quenched by passing air transversely across the filament bundle as described in U.S. 2,273,105. The filaments are drawn at a ratio of 3.4 to give a 70 denier yarn.

To determine if any appreciable decomposition of the polyoxymethylene ester occurs during the melt spinning procedure, a sample of the yarn is boiled for 1 hour in a 5% aqueous solution of oxalic acid to depolymerize the polyoxymethylene ester and the liberated formaldehyde is measured. The amount of polyoxymethylene ester calculated from this measurement is found to agree closely with that originally added.

The yarn is woven into a taffeta fabric after twisting and sizing in conventional manner. Crosslinking of the nylon is carried out by soaking in 2.5% ammonium fluoroborate, $NH_4BF_4$, solution, padding off the excess to a dry weight pick-up of 1.2%, drying and heating at 175° C. for about 10 minutes. The loss in weight of the fabric due to decomposition of the polyoxymethylene ester is 13%. The equilibrium volume swelling ratio, $q_m$, of filaments taken from the fabric is 2.9, indicating about 1200 crosslinks per million grams of fiber. The fabric is observed to be insoluble in nylon solvents, infusible, much more resilient, and more wrinkle resistant than similar fabric produced from uncrosslinked nylon yarn.

*Example II*

Yarn is prepared as in Example I except that the polymer mixture contains 10 parts of polyoxymethylene ester and 90 parts of 6-6 nylon. Analysis of the yarn as in Example I indicates no appreciable crosslinking. The yarn is woven into a taffeta fabric and the nylon crosslinked by soaking overnight in a 2.5% aqueous solution of ammonium fluoroborate, padding off the excess liquid, air drying and heating for 10 minutes at 175° C. The loss in weight of the fabric due to decomposition of the polyoxymethylene is 7.4% and the equilibrium volume swelling ratio, $q_m$, of the filaments taken from the fabric is 2.4. The fabric is infusible, insoluble in nylon solvents, much more resilient and more wrinkle resistant than a similar nylon fabric which is not crosslinked.

*Example III*

Yarn is prepared as in Example I, except that the polyoxymethylene ester used has a flow number of 0.9. Analysis of the yarn as in Example I indicates no appreciable crosslinking. The yarn is woven into taffeta fabric and crosslinked by soaking overnight in a 2% aqueous solution of ammonium chloride, air drying, and heating for 10 minutes at 175° C. with the fabric wrapped in aluminum foil in order to retain a formaldehyde atmosphere around the fabric. The loss in weight of the fabric due to decomposition of the polyoxymethylene is 11%, and the equilibrium volume-swelling ratio, $q_m$, of filaments taken from the fabric is 5.2. The fabric is infusible, insoluble in normal nylon solvents, and more resilient than a similar nylon fabric which is not crosslinked.

Example IV

Polyoxymethylene ester prepared as in Example I and having a flow number of 0.9 is mixed in granular form with 6 nylon (polycaprolactam) flake, the nylon being prepared in the conventional manner, and having a relative viscosity of 42. The resulting mixture, which contains 20 parts of the polyoxymethylene ester and 80 parts of 6 nylon, is melted and extruded in the conventional manner using a screw-type melting unit, the temperature of the melt being 260° C. and the hold-up time between melting and extrusion being about 5 minutes. The molten mixture is extruded to form 5 filaments which are quenched by passing air transversely across the filament bundle as described in U.S. 2,273,205. The filaments are drawn at a ratio of 3.5 to give a 75 denier yarn. Analysis of the yarn as in Example I indicates no appreciable crosslinking. The yarn is woven as a filling into a 70 denier 6-6 nylon warp after twisting and sizing in the conventional manner.

Crosslinking of the fabric is carried out by soaking in a 2.5% ammonium fluoroborate solution, padding off excess solution to a dry weight pick-up of 1.2% catalyst, and heating at 175° C. for about 10 minutes. The loss in weight of the fabric due to decomposition of the polyoxymethylene ester is 18%. The equilibrium volume-swelling ratio, $q_m$, of filaments taken from the fabric is 3.0. The fabric is observed to be insoluble in nylon solvents, infusible, and much more resilient than similar fabric produced from uncrosslinked nylon yarn. The fabric has improved recovery in both warp and filling directions, since formaldehyde liberated from the filling yarn also crosslinks the warp yarn.

Example V

The flake mixture of Example I and 6-6 nylon flake are melted and fed separately to a spinneret of the type used for extrusion of two component filaments, as described and illustrated (FIGS. 6 and 7) in U.S. 2,931,031. The 66 nylon and the polyoxymethylene ester-66 nylon blend are extruded in side-by-side relationship to form 34 two component filaments, one half of the filament being 66 nylon and the other half the 66 nylon-polyoxymethylene ester blend. The filaments are then quenched and drawn to give 70 denier yarn as described in Example I.

The yarn is woven into a taffeta fabric and treated with ammonium fluoroborate to decompose the polyoxymethylene ester as described in Example I. The resulting fabric has all of the desirable qualities of the fabric of Example I and in addition has improved bulk, drape and loft.

Example VI

A 48% aqueous solution of hexamethylene diammonium adipate (66 nylon salt) and 0.3 mole percent based on the salt of a 25% aqueous acetic acid solution (viscosity stabilizer) are charged to an evaporator and concentrated to 60% at atmospheric pressure, which corresponds to a final temperature of about 105° C. The 60% salt solution is transferred to an unstirred autoclave with steam atmosphere and heated in the closed autoclave until the steam pressure reaches 250 p.s.i. (requiring about 20 minutes). When this pressure is reached, bleeding off steam is started, maintaining 250 p.s.i. pressure, while the heating is continued until the concentration of salt (degree of polymerization of 1) is 90%, which corresponds to a temperature of 230° C. At this point the charging of 33% by weight (based on final polymer weight) of a 30% aqueous solution of polyvinyl pyrrolidone is started and completed over a period of 15 minutes. The polyvinyl pyrrolidone has a molecular weight of about 125,000 and is of sufficient purity to be stable against discoloration and crosslinking at high temperatures. After the charge is completed, the heating and bleeding off at 250 p.s.i. are continued until the temperature reaches 245° C. At this temperature the pressure reduction is started and continued over a period of about 90 minutes until the temperature has reached 270° C. when the pressure has been reduced to atmospheric. Heating at atmospheric pressure is continued until 275° C. is reached, to complete the polymerization. The autoclave is discharged by bringing it to 100 p.s.i. pressure of inert gas (nitrogen and carbon dioxide) and discharging molten polymer as a ribbon by extrusion through a narrow slit. The ribbon is quenched on a water cooled casting wheel and cut into ½ inch flakes. The polymer flake has a relative viscosity of 34.7. It has a polyvinyl pyrrolidone content of 9%.

66-nylon flake is prepared and mixed with polyoxymethylene ester as described in Example I.

The above mixtures are melted and fed separately to a spinneret to form two component filaments as described in Example V. When the yarn is processed into a fabric and treated with a catalyst to decompose the polyoxymethylene ester as described in Example V, the resulting fabric exhibits the desirable characteristics of the fabric of Example V except that the bulk is somewhat greater.

Example VII

Example I is repeated except that the di(methyl ether) of polyoxymethylene, prepared according to the process of Belgian Patent 584,924 using polyoxymethylene prepared as described in Example I, is substituted for the ester. Results obtained with this composition are substantially as described in Example I.

This invention permits the production of melt extruded shaped articles which are not crosslinked but which contain a polymer of formaldehyde which may be decomposed to liberate formaldehyde and crosslink the article at any subsequent stage in the processing.

Surprisingly, the polyoxymethylene derivatives do not decompose when mixed with a polyamide and melt extruded, although when separately heated to the same temperature they decompose rapidly. This enhanced stability of the polyoxymethylene ester in the presence of nylon is further illustrated by the fact that when using a catalyst to liberate formaldehyde in a yarn the polyoxymethylene ester decomposes at a relatively low temperature when the yarn is composed of the polyoxymethylene ester alone, but when mixed with nylon and melt spun into yarn, a higher temperature is required. With zinc fluoroborate, $Zn(BF_4)_2$, as a catalyst, yarn composed of the polyoxymethylene ester decomposes readily at 140° C. but, when mixed with nylon and melt spun into yarn, a temperature of 180° C. is required.

The polyoxymethylenes suitable for use in preparing the compounds of this invention must have a reaction rate constant at 222° C. of less than about 1%. The molecular weight of the polyoxymethylene is not critical but when the polymer mixtures are prepared for melt spinning of yarn it is preferred that the flow number of the derivative be in the range of 0.5 to 20, the optimum range being 0.9 to 12.

The number of ester or ether groups in the polyoxymethylene derivative is very small since they are at the chain ends. Depending on the conditions of preparation, these chains may be terminated at both ends by hydroxyl groups or at one end with a hydroxyl group and at the other end by a hydrogen atom. Since it is the hydroxyl group which reacts the ester or ether, the number of the latter groups present in the derivative varies accordingly.

The preferred organic acid anhydride for preparing the ester is acetic anhydride because of its low cost and ready availability. In general, however, any organic acid anhydride is operable in this invention, although the monofunctional anhydrides are preferred. Included in these acid anhydrides are the anhydrides of any aliphatic acid such as acetic, propionic, butyric, caproic, decanoic, stearic, cyclohexanecarboxylic and others as well as the aromatic acids, such as benzoic and phthalic acid. Derivatives of these acid anhydrides may be employed, particularly alkyl or aryl substituted acid anhydrides such as 4-phenyl benzoic acid anhydride. Mixed anhydrides such as acetic-propionic anhydride may also be employed.

The polyoxymethylene diethers may be formed by reacting the polyoxymethylene with dialkyl acetals such as dimethoxymethane, acetaldehyde dimethyl acetal, dibutoxymethane, propionaldehyde dibutal acetal, methoxybutoxymethane, butyraldehyde diethyl acetal and dihexoxymethane; orthoesters such as trimethylorthoformate, trimethylorthoacetate, tributylorthopropionate, tributylorthobutyrate, trihexylorthohexoate, tributylorthoformate, tripropyl orthoacetate, triethylorthoformate and triethylorthoacetate; ketals such as 3,3-diethoxypentane, 3-ethoxy-3-methoxy pentane, 3,3-dimethoxyheptane, 3,3-dimethoxypentane and 2,2-isobutoxypropane and orthocarbonates such as tetrapropylorthocarbonate and tetrabutylorthocarbonate.

The amount of polyoxymethylene derivative employed in the polymer mixtures will, of course, depend on the amount of crosslinking desired but should be in the range of about 2% to about 25% by weight. Amounts in excess of about 25% lead to excessive decomposition during the melt extrusion step, while amounts lower than about 2% are usually of little practical value. With mixtures of polyoxymethylene and 6-6 nylon or 6 nylon, it is preferable that the percentage by weight of polyoxymethylene be in the range of 5 to 20% and optimum results will be obtained in the range of 10–15%.

While the present invention has been exemplified only with 6 nylon and 6-6 nylon, any synthetic linear polyamide may be employed. Suitable polyamides include those disclosed in U.S. Patents 2,071,250; 2,071,251; 2,071,253; 2,130,523; 2,130,948; 2,163,636; 2,241,321; 2,241,322 and 2,241,323. In addition, any melt spinnable polymer or copolymer containing functional groups which react with formaldehyde, including polyurethanes, polyureas and polysulfonamides, may be employed.

The polyoxymethylene derivative and nylon may be mixed together in any suitable fashion. However, for most purposes mixing the two components in the form of granules or flakes is preferred. Mixing may be carried out in any convenient apparatus which assures a uniform composition. The extrusion of the polymer mixture may be carried out in the conventional manner; however, the length of time between melting and quenching of the resulting article should be minimized since the prolonged holding in the molten state will result in some decomposition of the polyoxymethylene. The maximum holding time in the molten state will, of course, depend on the melting point of the polyamide. For 6-6 nylon, however, satisfactory results may be obtained if the holding time is no more than about 15 minutes.

Crosslinking of the fabric or other finished product may be accomplished by treatment with a suitable catalyst followed by heating. Suitable catalysts for this purpose include various acid catalysts such as ammonium chloride, zinc fluoroborate, ammonium fluoroborate, fluoroboric acid and oxalic acid. The preferred catalyst from the standpoint of efficient decomposition of the derivative is ammonium fluoroborate. The amount of catalyst required, the temperature and heating time will depend upon the catalyst selected. In the case of fabrics, a concentration of catalyst in the range of about 0.5 to about 2.5% based on the weight of the fabric will usually prove satisfactory.

Fabrics produced in accordance with this invention have greater resilience and resistance to wrinkling than similar fabrics made from uncrosslinked polyamide yarns and may be used for wearing apparel and other purposes wherever nylon fabrcs are conventionally used. The fabric also has the characteristic that it is lighter in weight and more delustered than similar nylon fabrics due to the presence of voids in the filaments arising from the decomposition of the polyoxymethylene.

In addition to their usefulness as the sole constituent in filaments or other shaped structures, the nylon-polyoxymethylene derivative compositions of this invention may be used as one component in multicomponent systems produced, for instance, as described in U.S. 2,931,091. Such multicomponent systems may be employed to give fabrics of enhanced aesthetic properties. Suitable polymeric materials for use as the second component in these structures include the unmodified polyamides (Examples V and VI), copolyamides and polyamides containing hydrophilic polymers, such as the poly(N-vinyl lactams).

I claim:
1. A shaped article comprising an intimate mixture of from about 75 to about 98% by weight of a fiber forming synthetic linear polyamide which contains recurring carbonamide groups as an integral part of the main polymer chain and from about 2 to about 25% by weight of a modifier composition selected from the group consisting of ester and diether polyoxymethylene derivatives, said modifier composition having a reaction rate constant for thermal degradation at 222° C. of less than 1%.

2. The process comprising admixing from about 75 to about 98% by weight of a fiber forming synthetic linear polyamide which contains recurring carbonamide groups as an integral part of the main polymer chain with from about 2 to about 25% by weight of a modifier composition selected from the group consisting of ester and diether polyoxymethylene derivatives, said modifier composition having a reaction rate constant for thermal degradation at 222° C. of less than 1%, melting said admixture, extruding a shaped article from the molten admixture without substantial decomposition of said modifier composition, and subsequently heating said shaped article at a temperature between about 120 and about 210° C. in contact with an acid catalyst selected from the group consisting of ammonium chloride, zinc fluoroborate, ammonium fluoroborate, fluoroboric acid and oxalic acid.

3. The process of claim 2 wherein the polyamide is poly(hexamethylene adipamide) and the derivative is an acetic ester.

4. The process of claim 3 wherein the article is a filament shaped by melt-spinning.

5. A filament comprising a fiber forming synthetic linear polyamide which contains recurring carbonamide groups as an integral part of the main polymer chain containing admixed therein from 2–25% by weight of a modifier composition selected from the group consisting of ester and diether polyoxymethylene derivatives, said modifier composition having a reaction rate constant for thermal degradation at 222° C. of less than 1%.

6. A filament consisting essentially of a fiber forming synthetic linear polyamide which contains recurring carbonamide groups as an integral part of the main polymer chain containing admixed therein from 5–20% by weight of a modifier composition selected from the group consisting of ester and diether polyoxymethylene derivatives, said modifier composition having a reaction rate constant for thermal degradation at 222° C. of less than 1%.

7. A bicomponent filament, one component consisting essentially of a fiber forming synthetic linear polyamide which contains recurring carbonamide groups as an integral part of the main polymer chain containing admixed therein from 5–20% by weight of a modifier composition selected from the group consisting of ester and diether polyoxymethylene derivatives, said modifier composition having a reaction rate constant for thermal degradation at 222° C. of less than 1%, and the other component of said filament consisting essentially of a fiber forming synthetic linear polyamide which contains recurring carbonamide groups as an integral part of the main polymer chain.

8. A filament comprising a fiber forming synthetic linear polyamide which contains recurring carbonamide groups as an integral part of the main polymer chain containing admixed therein from 10–15% by weight of a modifier composition selected from the group consisting of ester and diether polyoxymethylene derivatives, said modifier composition having a reaction rate constant for thermal degradation at 222° C. of less than 1%.

9. A composition of matter consisting essentially of a fiber forming synthetic linear polyamide which contains recurring carbonamide groups as an integral part of the main polymer chain containing admixed therein from 2–25% by weight of a modifier composition selected from the group consisting of ester and diether polyoxymethylene derivatives, said modifier composition having a reaction rate constant for thermal degradation at 222° C. of less than 1%.

References Cited by the Examiner

UNITED STATES PATENTS

| 2,296,249 | 9/42 | Austin et al. | 260—67 |
| 2,844,561 | 7/58 | Bechtold et al. | 260—42 |
| 2,993,025 | 7/61 | Alsup et al. | 260—42 |

FOREIGN PATENTS

| 579,464 | 7/59 | Canada. |
| 567,167 | 12/59 | Canada. |
| 1,239,677 | 7/60 | France. |

MURRAY TILLMAN, *Primary Examiner.*

HAROLD N. BURSTEIN, LEON J. BERCOVITZ,
*Examiners.*